United States Patent

Dison

[15] 3,688,505
[45] Sept. 5, 1972

[54] DUCTED FAN ENGINE

[72] Inventor: James R. Dison, Indianapolis, Ind.

[73] Assignee: General Motors Corportion, Detroit, Mich.

[22] Filed: March 17, 1971

[21] Appl. No.: 125,161

Related U.S. Application Data

[62] Division of Ser. No. 865,573, Oct. 13, 1969, Pat. No. 3,611,834.

[52] U.S. Cl. .................. 60/226 R, 60/268, 60/269
[51] Int. Cl. ........................... F02k 3/04, F02c 3/06
[58] Field of Search...60/226 R, 262, 268, 269, 39.16 C

[56] References Cited

UNITED STATES PATENTS 2,501,633   3/1950   Price ........................ 60/262

*Primary Examiner*—Douglas Hart
*Attorney*—Paul Fitzpatrick and Jean L. Carpenter

[57] ABSTRACT

A gas turbine engine of the lift type exerts lift principally by a ducted fan mounted around the mid-portion of the gas turbine engine and coaxial with it. The engine shaft drives two coaxial gear sets, one having a rotating spider and the other a rotating ring gear, these rotating in opposite directions at the same speed. Each gear set drives a bevel gear coaxial with the turbine axis, these gears being coupled together by a thrust bearing. A substantial number of radial drive shafts extend across the motive fluid duct of the gas turbine, each bearing a bevel pinion meshing with both of the bevel gears. The outer ends of these shafts bear spur pinions which mesh with a circular rack type gear external to the motive fluid duct and fixed to the hub of the fan. The fan is mounted on a large ball bearing on the exterior of the turbine casing.

4 Claims, 2 Drawing Figures

PATENTED SEP 5 1972 3,688,505

INVENTOR.
James R. Dison
BY
Paul Fitzpatrick
ATTORNEY

DUCTED FAN ENGINE

This application is a division of my application Ser. No. 865,573 for Fan Drive filed Oct. 13, 1969, now U.S. Pat. No. 3,611,834.

My invention is directed to turbofan engines and, more specifically, to an improved arrangement of a turbofan lift engine having improved gearing between the engine and the fan making many improvements of the engine possible.

Lift jet engines of various types and turbofan engines of various types are known; also, lift turbofan engines. As the term is used here, a turbofan engine is one in which a gas turbine engine drives a fan which propels air at high speed through a closed duct, the engine thrust being largely due to the change in momentum of the air propelled by the fan. In usual turbofan engines, the fan is in front of the inlet to the gas turbine or is mounted aft of the gas turbine. The fan may be driven by a separate independently rotating turbine or may be driven by a turbine which drives all or part of the compressor stages of the gas turbine engine. Because of the high speed air flow through the enclosed duct, a turbofan engine is intermediate in characteristics between a turbojet and a turboprop, being much more compact than the turboprop and having considerably higher thrust for a given sized gas turbine than a turbojet.

Various criteria for assessing the worth of lift jet engines have been developed, one of the most important being the ratio of thrust or lift to weight of the power plant. Another very important one is the compactness of the power plant; particularly, in most cases, minimization of its overall length. Another important criterion is reasonable fuel economy even though such engines ordinarily operate for very short duty cycles. Reliability is of utmost importance in a lift engine, even more so than in a propulsion engine.

In its preferred embodiment, my invention provides a reduction gear providing a large speed reduction between a high speed power output shaft of a gas turbine engine and a large low speed ducted fan concentric with the engine and mounted around the engine adjacent its mid-length. With this structure, the high reduction ratio provides for a compact and efficient gas turbine as well as for a large and efficient fan having a high total thrust. The structure is such as to be capable of handling high horsepower with a minimum of interference with air flow through the gas turbine and with the fan drive components primarily located in what are otherwise normally empty areas within the power plant.

The principal objects of my invention are to provide an improved lift fan engine and to provide an engine of very high static thrust for its weight, of low specific fuel consumption, and of relatively quiet operation, resulting from a large diameter of the low speed fan. A further object is to provide an improved mounting for the ducted fan employing a large diameter ball bearing to provide thrust and moment reaction for the fan. A further object is to mount the ducted fan on a large diameter ball bearing external to the operative parts of the gas turbine engine.

A further object is to provide means for transmitting a large amount of power radially across the motive fluid duct of a gas turbine engine without significant interference with flow patterns in the engine. A still further object is to reduce the length of the engine.

In the preferred embodiment of my invention, these objects are attained by the following combination of mechanisms:

A gas turbine engine of the lift type exerts the lift primarily through a ducted fan mounted around the mid-portion of the gas turbine engine and coaxial with it. The engine shaft drives two coaxial gear sets, one having a rotating spider and the other a rotating ring gear, these rotating in opposite directions at the same speed. Each gear set drives a bevel gear coaxial with the turbine axis, these gears being coupled together by a thrust bearing. A substantial number of radial drive shafts extend across the motive fluid duct of the gas turbine, each bearing a bevel pinion meshing with both of the bevel gears. The outer ends of these shafts bear spur pinions which mesh with a circular rack type gear external to the motive fluid duct and fixed to the hub of the fan, which is mounted on a large ball bearing on the exterior of the turbine casing. It will be seen, however, that some of these features might be employed independently of others.

The nature of my invention and its advantages will be further apparent from the succeeding detailed description of the preferred embodiment and the accompanying drawings thereof.

Figure 1:
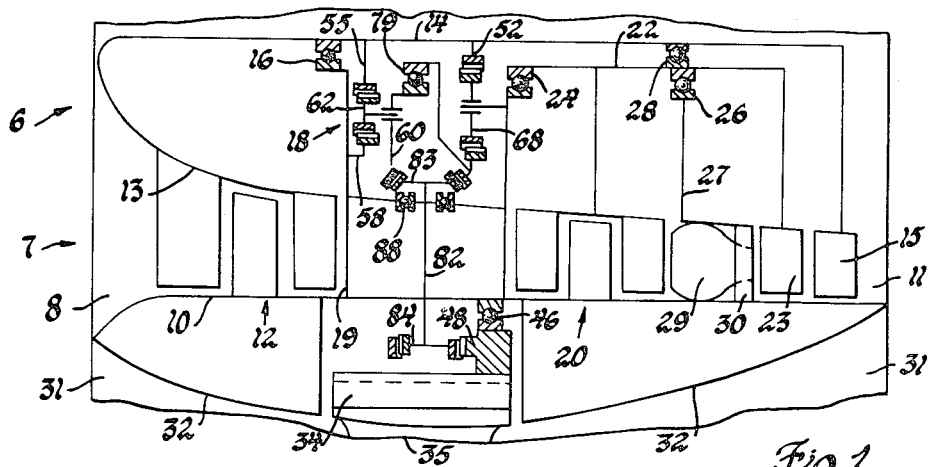
FIG. 1 is a schematic illustration of a ducted fan type gas turbine lift engine.

It should be understood that my invention is not concerned with the structure of the gas turbine prime mover itself, which may be of any suitable type; but, since the invention may be more readily understood by reference to a preferred type of gas turbine power plant, such a power plant is illustrated schematically in FIG. 1 and may be described as follows:

The gas turbine power unit or prime mover 6 is of a dual shaft type having an annular motive fluid duct 7 extending from an air intake 8 through an engine outer casing 10 to an exhaust 11. The power unit includes a low pressure compressor 12, the rotor 13 of which is coupled through a shaft 14 to a low pressure turbine wheel 15. The rotating parts of the low pressure compressor and low pressure turbine constitute a low pressure spool rotatably mounted in bearing 16 mounted on a bearing support assembly 18 supported by struts 19 extending across the engine motive fluid duct from the outer casing 10. Struts 19 of suitable streamlined airfoil form extend across the engine motive fluid path downstream of the low pressure compressor and upstream of a high pressure compressor 20 which includes a rotor mounted on an outer shaft 22 driven by a high pressure turbine wheel 23. These constitute a high pressure spool mounted in a forward bearing 24 on the bearing support 18 and in a rear bearing 26 supported by a web 27 from the outer case. A bearing 28 mounted between the two shafts provides additional support for the inner shaft 14.

The engine motive fluid is energized by combustion apparatus 29 mounted between the high pressure compressor and high pressure turbine discharging through a nozzle 30. The turbine wheels 23 and 15 as shown are counterrotating. In an engine as described, the two compressors compress the motive fluid which is then heated by the combustion apparatus and expands through the high pressure and low pressure turbines 23 and 15, the high pressure turbine driving the high pressure compressor 20 and the low pressure turbine 15 driving the low pressure compressor 13 and also providing a power output to drive the ducted fan which provides substantially all of the thrust or lift of the engine.

It is to be understood that the structure so far described may be varied widely and is intended merely as a general illustration of engine structure. It also should be understood that the axis of rotation in a lift engine is normally substantially vertical.

Figure 2:
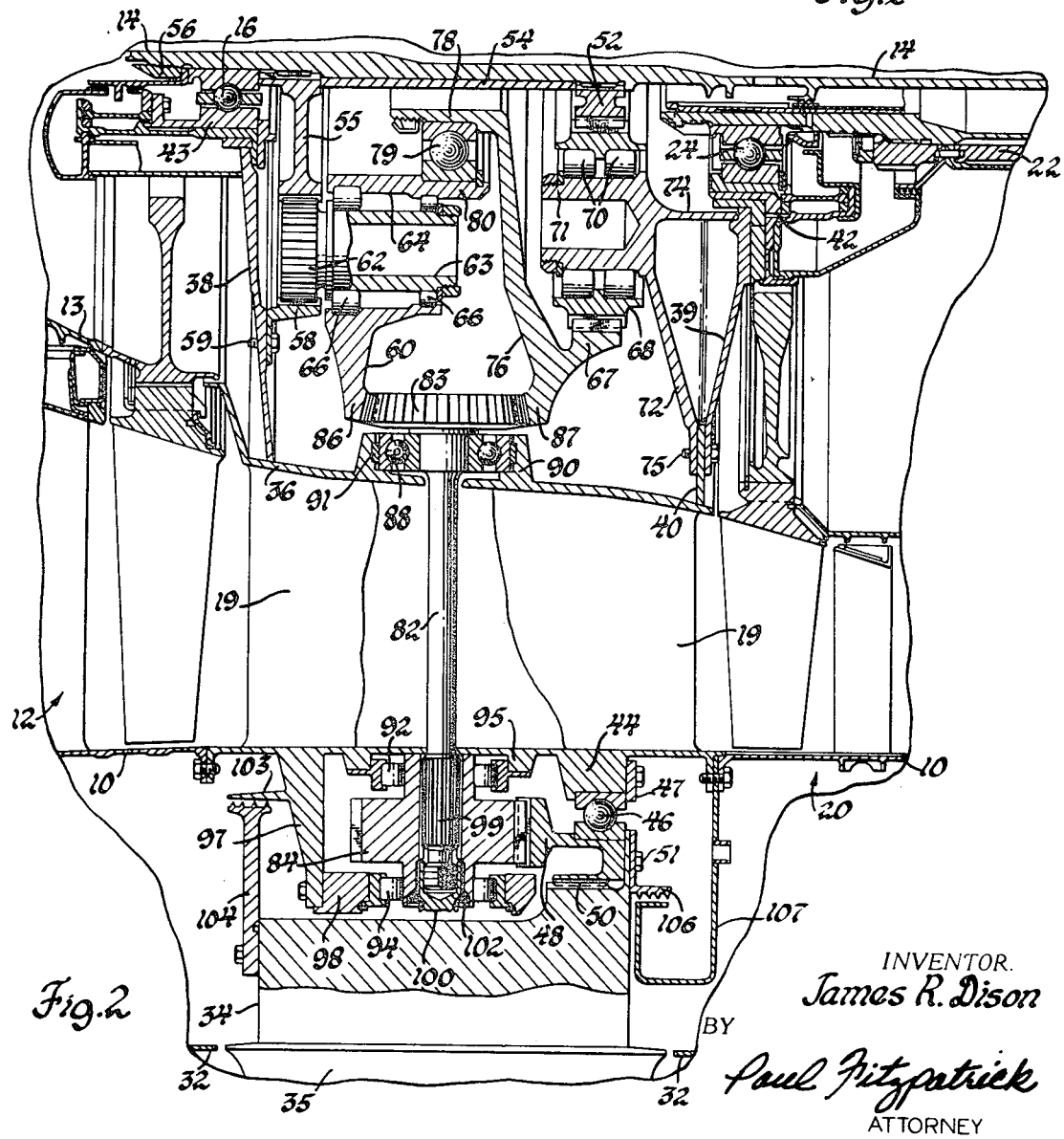
FIG. 2 is an illustration of the fan drive portion of the engine, taken in section on a plane containing the axis of rotation of the gas turbine and the fan.

Considering now the ducted fan, this is a large multi-blade fan which propels a large quantity of air, relative to the air flow through the gas turbine, through a fan duct 31 defined by an inner wall 32 concentric with the gas turbine casing and an outer wall (not illustrated). The fan comprises an annular hub 34 on which a ring of blades 35 are mounted by a dovetail or other suitable connection. The span of the blades 35 may approximately equal the radius of hub 34. Referring now also to FIG. 2, it may be noted that the bearing support 18, which is supported from the outer casing 10 by a number of struts 19, is an annular enclosure defined by a portion 36 of the inner wall of the motive fluid path between the compressors 12 and 20, by a forward annular wall 38, and by a rear wall 39 bolted to a flange 40 extending inwardly from inner wall 36. The forward end of high pressure spool shaft 22 is supported in the ball bearing 24 mounted in a suitable cage 42, the details of which are immaterial, fixed to the wall 39. Low pressure spool shaft 14 is supported in part by the ball bearing 16 mounted in a suitable cage 43 fixed to the forward wall 38.

A heavy reinforcing flange 44 on the exterior of outer casing 10 supports the inner race of a large diameter ball thrust bearing 46 held by a retainer ring 47. The outer race of bearing 46 is fixed to a face gear 48 which is the output ring gear of the reduction gear mechanism. This face gear includes a cylindrical web which is coupled by splines indicated at 50 to the interior of hub 34. The hub is fixed to the face gear by a ring of cap screws 51 which also retain the face gear on the ball bearing 46.

Proceeding now to the gearing by which the face type output ring gear 48 is driven; two sun gears are fixed to the gas turbine power output shaft 14. Sun gear 52 splined to the shaft abuts a flange on the shaft. It is held against the flange by a sleeve 54 encircling the shaft, which in turn is abutted by a front sun gear 55 also splined to the shaft. This gear is retained by the inner race of ball bearing 16 which is held by a spanner nut 56 threaded onto shaft 14. The two sun gears 52 and 55 constitute the inputs to two gear sets, a front set having a fixed ring gear and a rotating planet carrier or spider and a rear set having fixed intermediate gears distributed around the sun gear and a rotating ring gear driven by the intermediate gears. The gears of these gear sets are straight spur gears, thus preventing the development of axial thrust on the gear sets due to the torque transmitted. A front ring gear 58 is fixed to the wall 38 by a ring of cap screws 59, the structure being such that a small amount of angular adjustment of ring gear 58 about its axis for alignment purposes is permitted. A rotatably mounted spider or planet carrier 60 bears intermediate gears 62, each on a hollow shaft 63. The shafts 63 are supported in bores 64 in the planet carrier by roller type antifriction bearings 66. These intermediate gears mesh with the sun gear 55 and non-rotating ring gear 58. Thus, upon rotation of shaft 14, the spider 60 is rotated about the axis of the shaft at a reduced speed.

The rear gear set includes a ring gear 67 rotatable about the axis of shaft 14 and intermediate gears 68 meshing with ring gear 67 and sun gear 52. These intermediate gears 68 are rotatably mounted by antifriction bearings 70 on hollow trunnions 71 extending from a fixed spider or intermediate gear support 72 bolted to the flange 40 and including an axially extending web 74 which abuts the rear wall 39 of the bearing support 18. Spider 72 is fixed to flange 40 by cap screws 75, the arrangement being such that the spider 72 may be adjusted to a small extent about the axis of shaft 14 for alignment of the gear set.

Ring gear 67 includes a web 76 terminating in a hollow shaft 78 to which is fixed the inner race of a ball thrust bearing 79. The outer race of this bearing is fixed to the hub or inner periphery 80 of the rotatable spider or planet carrier 60. This arrangement provides a positive connection between the spider 60 and ring gear 67 preserving a fixed spacing between these two axially of the engine and absorbing the thrust tending to separate these two elements due to the gearing connecting them to the output gear 48, to be described. The two gear sets just described have numbers of teeth on the respective elements such that the spider 60 and ring gear 67 are driven at the same speed in opposite directions by shaft 14.

Proceeding now to the radial shaft arrangement by which power is transmitted from the two gear sets to the output face gear 48, there are a considerable number of radial or quill shafts 82, each of such shafts extending across the motive fluid path through one of the streamlined struts 19. Each of these radial shafts bears a bevel pinion 83 at its inner end and a straight spur pinion 84 at its outer end. Each bevel pinion 83 meshes with both a bevel gear 86 integral with the rotatable spider 60 and a bevel gear 87 integral with the rotatable ring gear 67. Each radial shaft 82 is mounted at its inner end in a ball thrust bearing 88 mounted in a socket 90 on the inner surface of the motive fluid path inner wall 36. Bearings 88 accept the outward thrust of bevel gears 87. Each bearing 88 has its outer race mounted in a slightly yieldable circumferential spring 91 which may be of the general type of that described in U.S. Pat. No. 3,053,590.

The spur pinion 84 at the outer end of shaft 82 is integral with two stub shafts by which it is straddle mounted in two roller bearings 92 and 94, these allowing axial movement of the spur pinion 84 (radially of the engine). The outer race of bearing 92 is fixed to an annular boss 95 extending from the engine casing 10. The bearings 94 are fixed in circular sockets in a bearing mounting ring 98 bolted to a flange 97 extending radially outward from the engine outer casing. Each spur pinion 84 is coupled to its shaft 82 by slightly pitched splines 99 so that the pinion may be adjusted circumferentially with respect to the shaft 82 by moving it axially along the shaft. The axial position of the pinion on the shaft is determined by a nut 100 threaded onto the end of the shaft and axially fixed with respect to the pinion by a radially expanding snap ring 102. Suitable means may be provided to lock the nut 100 against rotation relative to the pinion 84. The face gear and spur pinion combination allows such adjustment of the pinion without disturbing the mesh of the gear teeth.

A labyrinth seal upstream of the fan rotor is provided by a flange 103 extending forwardly from the flange 97 and by a ring 104 bolted to the forward face of hub 34. A labyrinth seal downstream of the hub is defined by a seal ring 106 mounted on the hub and by a toroidal oil sump 107 bolted to the outer casing 10.

With respect to operation of the device, there is no need to describe the operation of the gas turbine prime mover. The shaft 14 driven by the prime mover rotates the two sun gears 52 and 55 which drive through the coaxial gear sets to rotate the bevel gears 86 and 87 in opposite directions at the same speed. These gears engage the bevel pinions 83 to drive the radial shafts 82 and through them the spur pinions 84 which combine to drive the output face gear 48 which is fixed to the hub of the fan rotor.

To give an idea of typical suitable parameters for the engine, the input shaft 14 may rotate at 13,000 rpm, the radial shafts 82 at 33,000 rpm, and the gear 48 and fan at 3180 rpm. This is in a fan design in which the outer diameter of the fan is 6 feet and the horsepower absorbed by the fan is 17,000 horsepower. By virtue of the fact that a number of thin radial shafts are used, these shafts may pass through struts across the engine motive fluid path with a minimum of interference with fluid flow. Also, by virtue of the use of a number of shafts, a great amount of power may be transmitted. The drive to the radial shafts is compact particularly because of the division of power between the two coaxial gear sets and is thus readily accommodated within the engine motive fluid path.

The gears may be aligned to secure even mesh of the components by circumferential adjustment of the support 72 and the ring gear 58 and by axial adjustment of the pinions 84 to adjust their angular position with respect to their shafts so that a positive mesh is provided at all of the gear sets. Since there is a considerable number of the radial shafts and since they rotate at relatively high speed, they may be of small diameter. The small diameter shafts may twist to some extent to equalize load carried by the shaft in the event of any tendency to unequal distribution of the load. The large diameter ball bearing 46 is particularly suited to accept thrust and moment reactions of the fan. Since the fan is mounted abreast of the engine, the overall power unit need be no longer than a simple jet engine. The separating load between the pinions 84 and the face gear 48 serves to partially counteract the thrust load put on bearing 46 by the fan blades 35. It will be seen that the invention, particularly in its preferred embodiment, provides a particularly suitable drive system for a ducted fan and a particularly compact and desirable turbofan type lift engine.

The detailed description of the preferred embodiment of my invention for the purpose of explaining the principles thereof is not to be considered as limiting the invention, since many modifications may be made by the exercise of skill in the art.

I claim:

1. A ducted fan engine comprising, in combination, a gas turbine prime mover comprising means defining a motive fluid duct, compressor means, combustion chamber means, and turbine means disposed in flow series in the motive fluid duct in the order named, the compressor means supplying air to the combustion chamber means and the combustion chamber means supplying motive fluid to the turbine means, at least some of the turbine means being connected to drive the compressor means; a ducted fan including an air-propelling rotor disposed for rotation around the prime mover downstream of at least some of the compressor means and upstream of at least some of the turbine means; and means drivingly coupling the turbine means to the ducted fan rotor comprising two opposed gear sets disposed within the motive fluid duct and having equal speed counterrotating output gears, a plural number of radial shafts extending across the motive fluid duct, pinion means on each radial shaft meshing with both output gears, a ring gear rotatably mounted externally of the motive fluid duct rotating with and driving the fan, and a pinion on each radial shaft meshing with the said ring gear.

2. A ducted fan engine comprising, in combination, a gas turbine prime mover comprising means defining a motive fluid duct, compressor means, combustion chamber means, and turbine means disposed in flow series in the motive fluid duct in the order named, the compressor means supplying air to the combustion chamber means and the combustion chamber means supplying motive fluid to the turbine means, at least some of the turbine means being connected to drive the compressor means; a ducted fan including an air-propelling rotor disposed for rotation around the prime mover downstream of at least some of the compressor means and upstream of at least some of the turbine means; and means drivingly coupling the turbine means to the ducted fan rotor comprising two opposed gear sets disposed within the motive fluid duct and having equal speed counter-rotating output gears, a plural number of radial shafts extending across the motive fluid duct, pinion means on each radial shaft meshing with both output gears, a ring gear rotatably mounted externally of the motive fluid duct rotating with and driving the fan, and a pinion on each radial shaft meshing with the said ring gear; the ducted fan including a fan duct externally of the means defining the motive fluid duct and providing an annular space between the ducts.

3. A ducted fan engine comprising, in combination, a gas turbine prime mover comprising means defining a motive fluid duct, compressor means, combustion chamber means, and turbine means disposed in flow series in the motive fluid duct in the order named, the compressor means supplying air to the combustion chamber means and the combustion chamber means supplying motive fluid to the turbine means, at least some of the turbine means being connected to drive the compressor means; a ducted fan including an air-propelling rotor disposed for rotation around the prime mover downstream of at least some of the compressor means and upstream of at least some of the turbine means; and means drivingly coupling the turbine means to the ducted fan rotor comprising two opposed gear sets disposed within the motive fluid duct and having equal speed counter-rotating output gears, a plural number of radial shafts extending across the motive fluid duct, pinion means on each radial shaft meshing with both output gears, a ring gear rotatably mounted externally of the motive fluid duct rotating with and driving the fan, and a pinion on each radial shaft meshing with the said ring gear; the ducted fan including a fan duct externally of the means defining the motive fluid duct and providing an annular space between the ducts, and the fan rotor including a hub within the said annular space and blades projecting into the fan duct.

4. A ducted fan engine comprising, in combination, a gas turbine prime mover comprising means defining a motive fluid duct, compressor means, combustion chamber means, and turbine means disposed in flow series in the motive fluid duct in the order named, the compressor means supplying air to the combustion chamber means and the combustion chamber means supplying motive fluid to the turbine means, at least some of the turbine means being connected to drive the compressor means; a ducted fan including an air-propelling rotor disposed for rotation around the prime mover downstream of at least some of the compressor means and upstream of at least some of the turbine means; and means drivingly coupling the turbine means to the ducted fan rotor comprising two opposed gear sets disposed within the motive fluid duct and having equal speed counter-rotating output gears, a plural number of radial shafts extending across the motive fluid duct, pinion means on each radial shaft meshing with both output gears, a ring gear rotatably mounted externally of the motive fluid duct rotating with and driving the fan, and a pinion on each radial shaft meshing with the said ring gear; the ducted fan including a fan duct externally of the means defining the motive fluid duct and providing an annular space between the ducts, the fan rotor including a hub within the said annular space and blades projecting into the fan duct, and a large ball thrust and radial bearing mounted within said annular space supporting the rotor.

* * * * *